July 5, 1932.  T. C. DOBBINS  1,865,681
BATTERY TERMINAL
Filed Feb. 7, 1930

Inventor
Timothy C. Dobbins.
By A. J. O'Brien
Attorney

Patented July 5, 1932

1,865,681

UNITED STATES PATENT OFFICE

TIMOTHY C. DOBBINS, OF DENVER, COLORADO, ASSIGNOR OF ONE-HALF TO S. H. BASSOW AND ONE-FOURTH TO EUGENE MESSINA, BOTH OF DENVER, COLORADO

BATTERY TERMINAL

Application filed February 7, 1930. Serial No. 426,516.

This invention relates to improvements in connectors for battery terminals.

Practically every automobile and truck is provided with electric lights and with an electric starter and for this purpose each automobile is also provided with a storage battery and with a generator connected with the engine. The parts are so arranged that when the engine is operating the battery is being charged and therefore the electrical energy stored in the battery is always available for operating the lights and for operating the starting motor. Each battery is provided with two terminal posts and cables extend from these posts to the starting switch. Since it is frequently necessary to remove the battery for repairs or recharging, it is desirable to provide the cables with connectors that can readily be attached to and removed from the battery terminals. Owing to the fact that storage batteries contain an electrolyte composed of sulphuric acid, the terminals and the connectors must either be made from lead or be heavily coated with lead, as this is the only available metal that will resist the action of sulphuric acid.

Experience has shown that the ordinary connectors that are clamped to the battery posts by the action of a clamping bolt are very difficult to remove owing to the fact that corrosion invariably takes place and therefore when the connectors are to be detached, it is difficult and often impossible to turn the nut on the bolts and this makes it necessary to remove the terminals or connectors by means of specially constructed tools.

It is an object of this invention to produce battery terminal connectors that shall be so constructed that they can be quickly put into place and as quickly and readily removed and which shall also make good electrical connection with the battery terminals.

Another object of this invention is to produce a battery terminal connector that shall be so constructed that it can be made with a minimum amount of labor and material and which can therefore be manufactured and sold at a cheaper price than the ordinary connectors now in use.

The above and other objects of this invention that may become apparent as the description proceeds are attained by means of a construction and an arrangement of parts that will now be described in detail, reference for this purpose being had to the accompanying drawing in which the preferred embodiment has been illustrated and in which.

Figure 1:
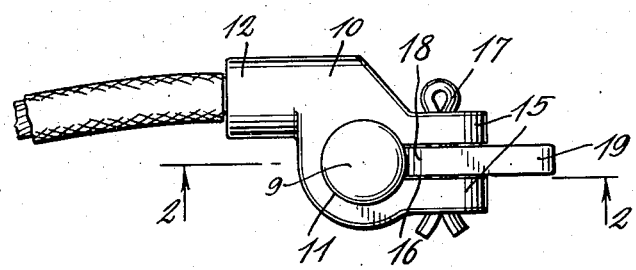
Fig. 1 is a top plan view of one of my improved terminal connectors.

In the drawing reference numeral 1 represents the cover of an electric storage battery. This cover is provided with one or more openings 2 through which the threaded portion 3 of the battery terminal 4 extends. This terminal is provided with a collar 5 that fits against the under surface of the cover and is separated from the latter by means of a rubber washer 6. A nut 7 cooperates with the threaded portion and is separated from the upper surface of the cover by means of a rubber washer 8. A tapered portion 9 extends upwardly above the threaded portion 3 and to this tapered portion connection is made by means of a suitable terminal 10 that is secured to the end of cable.

Figure 2:
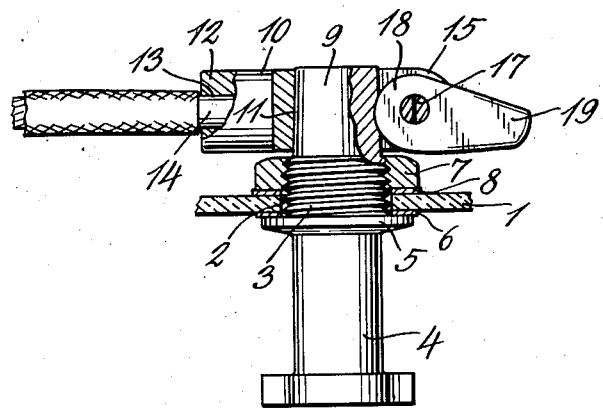
Fig. 2 is a section taken on line 2—2, Fig. 1.

My invention relates to the construction of the connector 10 and this will now be described. This connector is preferably formed from copper which has been heavily coated with lead, and is provided with a central opening 11 that is preferably tapered so as to conform to the taper of part 9. A lug 12 extends from one side of the connector and this is provided with a socket 13 into which the end 14 of the cable extends. The cable is sweated to the lug in the ordinary manner. The connector has been shown as provided with two parallel projections or ears 15 that are spaced apart so as to provide an opening 16 whose inner end communicates with the opening 11. Located between the two ears 15 and pivotally connected to them by means of a pin 17 is a cam 18. This cam is provided with a short handle 19 by means of which it can be rotated, and its eccentricity is such that when it is in the position shown in Fig. 2, the cam surface will project into the interior of opening 11 and therefore when the connector is in place, the cam will embed itself into the surface of the tapered part 9 of the battery terminal. Since the battery terminal is made from lead the cam will form a dent that will serve to hold the parts positively in place, and besides this, the relative rotary motion of the cam and the surface of member 9 produces a very good electrical contact, especially in view of the fact that both of the contacting surfaces are made of lead, and therefore, when they are moved relative to each other an excellent electrical contact is established.

Connectors like those shown and described can be very quickly put into place because there are no bolts and nuts to be tightened and the cam can be quickly rotated to clamping position and in this manner a large amount of time is saved in applying the connectors to the terminals. When the battery is to be removed for any purpose the terminals can be very quickly disconnected as it is merely necessary to rotate the cams from clamping to releasing position, after which the connectors can be lifted from the terminal.

I want to call particular attention to the fact that the cam indents itself in the side of the terminal so as to form a positive holding means that prevents accidental removal of the connector and I also want to emphasize the sliding contact between the cam surface and the terminal when the cam is moved to latching position as this produces the best possible electric connection.

From the above description it will be apparent that I have produced a battery terminal connector of a very simple and substantial construction that can be readily applied, and removed, and which is positively held in position.

Having described the invention what is claimed as new is:

1. A battery terminal connector comprising, a metal member having an opening adapted to receive a battery terminal, the member having a cut in communication with the opening and extending entirely through the wall surrounding the opening, and an eccentric cam located in the cut and pivotally attached to the walls thereof, said cam when in one position to extend into the opening in the connector whereby it will be forced against the side of the terminal so as to make good contact therewith and hold the lug in place thereon.

2. A battery terminal connector comprising, a connector body member having an opening adapted to receive a battery terminal post, the body member being also provided with a socket adapted to receive one end of a cable, two spaced lugs extending from one side of the connector, the space between the lugs being in communication with the opening in the connector, and an eccentric cam pivotally connected to the lugs and located between them, said cam when in one position extending into the opening whereby it can be forced against the terminal post with sufficient force to embed itself therein and form good electrical contact therewith and whereby it will also firmly secure the lug to the terminal.

3. A battery terminal connector comprising, a member having a socket adapted to receive one end of a cable and an opening adapted to receive a battery terminal post, the wall of the opening terminating in two spaced lugs, and an eccentric cam located between the lugs and mounted for rotation about a pivot that extends substantially at right angles to the axis of the opening, said cam when in one position projecting into the opening so that it contacts with the battery terminal and indents the surface thereof.

In testimony whereof I affix my signature.

TIMOTHY C. DOBBINS.